July 11, 1961  A. F. M. VAN ROOIJ  2,991,673
DEVICE FOR GROOVING SUPERFINISHED STEEL SHAFTS
Filed Oct. 31, 1958
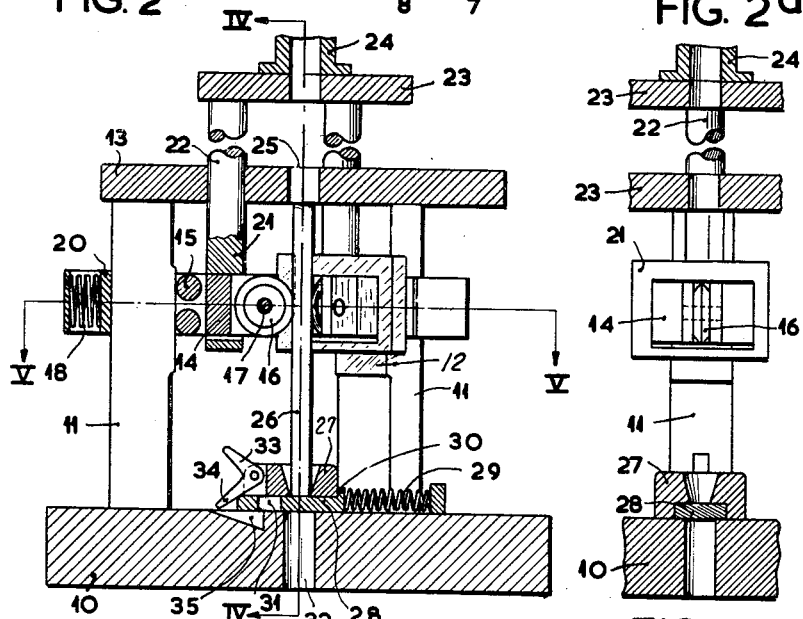
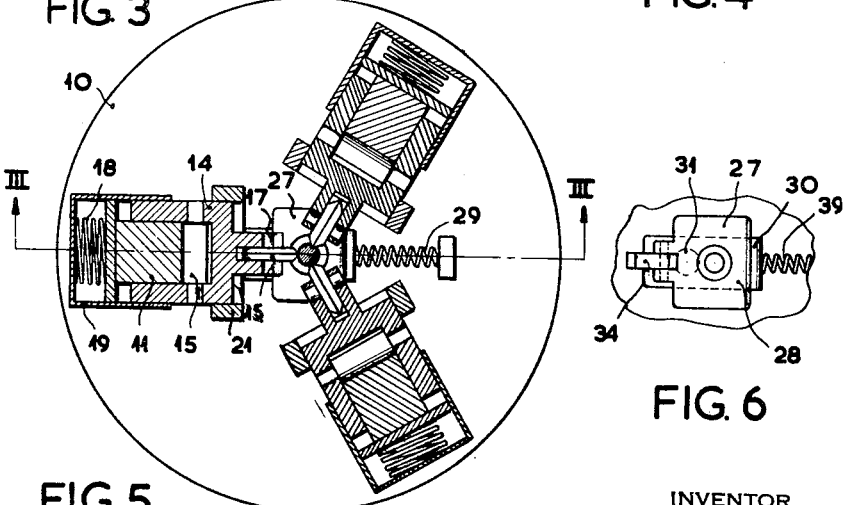
INVENTOR
ADRIANUS FRANCISCUS MARIA VAN ROOIJ
BY
AGENT United States Patent Office 2,991,673
Patented July 11, 1961

2,991,673
DEVICE FOR GROOVING SUPERFINISHED STEEL SHAFTS
Adrianus Franciscus Maria van Rooij, Eindhoven, Netherlands, assignor to North American Philips Company, Inc., New York, N.Y., a corporation of Delaware
Filed Oct. 31, 1958, Ser. No. 771,102
Claims priority, application Netherlands Dec. 19, 1957
3 Claims. (Cl. 80—40)

It is known for thin shafts to which certain parts are to be rigidly secured, to be provided with milled edges or radial grooves, the edges of the grooves projecting several hundredths of a millimeter from the surface of the shaft, and to press the relevant parts each having an aperture substantially equal to the diameter of the shaft, onto the shaft. For mass production this is the indicated method. The grooves may be provided, for example, on a lathe by means of a suitable tool or obtained by rolling. However, such methods involve disadvantages for superfinished shafts having a maximum diameter of 6 mms. Such a shaft, the surface of which satisfies the most stringent requirements as regards roughness, cannot be clamped in position without deteriorating part of the surface and, furthermore, such shafts do not remain fully straight during the said treatments. True, the deviations are sometimes only about several microns, but in many cases this is not permitted.

In certain cases it is possible by taking special precautions and during a rolling treatment to provide such grooves and maintain the shaft straight, but this involves higher cost of manufacturing the shaft.

The present invention relates to a method of providing the outer surface of a superfinished shaft having a maximum diameter of 6 mms. with two or more axial grooves which are relatively at the same angles, the edges of the grooves being required to project from the surface of the shaft, and it is characterized in that one end surface of the shaft is disposed on a support and subsequently, a relative movement of two or more steel wheels with respect to the shaft takes place, which have sharp edges and are positioned along the periphery of the shaft, said wheels being relatively arranged at the same angles so as to press grooves into the shaft. The shaft is thus not clamped, so that the surface is not damaged and in practice the shaft appears to remain completely straight.

In one embodiment of the invention, if the shaft is to be provided with grooves only over a portion of its length, the radial position of the wheels with respect to the shaft is preferably determined by the relative movement of the wheels with respect to the length of the shaft.

It is possible to give the shaft an axial movement with respect to the wheels which are stationary in the axial direction. However, a construction suitable for mass production is obtained if, in another embodiment of the invention, the shaft is positioned on a support stationary in the axial direction, whereafter the wheels are displaced in the longitudinal direction of the shaft along guide paths which may, if desired, have a certain profile and as a result of this displacement, after the grooves being provided, the support is removed in the radial direction.

According to the invention, a device for carrying out the above-mentioned method is characterized in that it comprises a support for the shaft which is surrounded by a plurality of guide paths which may have a certain profile, if desired, and are parallel to the shaft, the device also comprising a plurality of steel wheels having sharp edges and rotatably arranged in a bifurcated member, which bifurcated members are connected together and each capable of moving along a guide path so that, due to a relative movement of the shaft with respect to the guide paths, the wheels press the grooves into the shaft.

In one preferred embodiment of the invention, resulting in a device which is compact and may be manufactured in a simple manner, the assembly comprising wheels and bifurcated members is set into movement and the shaft is stationary, the said assembly comprising means which, after the movement is terminated, remove the support of the shaft.

In order that the invention may be readily carried into effect, one embodiment will now be described in detail, by way of example, with reference to the accompanying drawing, in which:

FIG. 1 shows, on an enlarged scale, a thin superfinished steel shaft having, at two areas, many axial grooves the edges of which project from the surface of the shaft;

FIG. 1a is a side-view of the shaft of FIG. 1;

FIG. 2 shows a similar shaft as in FIG. 1, but now provided with three grooves which are relatively at the same angles, FIG. 2a being a side-view of this shaft;

FIG. 3 is a sectional view taken along the line III—III of FIG. 5, as viewed in the direction of the arrow;

FIG. 4 is a sectional view of FIG. 3 taken along a line IV—IV, as viewed in the direction of the arrow;

FIG. 5 is a sectional view taken along the line V—V of FIG. 3, also viewed in the direction of the arrow, and FIG. 6 is a plan view on the support for the shaft shown in FIG. 3.

In FIG. 1, and in the side-view of FIG. 1a, reference numeral 1 indicates a shaft (shown on an enlarged scale) which has a superfinished surface and actually a diameter of 4 mms. The shaft 1 has two portions provided with axial grooves 2 and 3, which grooves have edges 4 which project from the surface of the shaft. Component parts 5 and 6, shown diagrammatically, are pressed on the portions provided with grooves 2 and 4, which component parts may be, for example, rotor sheets of an electric motor and of a collector assembly. In forming the grooves, difficulties are encountered in practice. The clamping of the shaft is not permitted, the surface then being damaged, and rolling of the grooves usually results in a curvature of the shaft of, for example, several microns, which is not much, it is true, but is nevertheless not permitted.

FIG. 2 and the side-view FIG. 2a, show a similar shaft, now indicated by 7, provided with three grooves 8, which grooves are relatively at the same angles and have projecting edges 9. The grooves are provided by means of the device shown in FIGS. 3, 4, 5 and 6, the shaft not being clamped and not being curved after treatment. In said figures, reference numeral 10 indicates a base plate on which three guide paths 11 are positioned. The guide paths 11 are internally shaped, the portion 12 being located more inwards than the remainder of the guide paths. At the top, the guide paths 11 are connected together by means of an annular supporting plate 13, resulting in a rigid assembly. A bifurcated member 14 which carries two rollers 15, together with a hard-steel wheel 16, can slide along each guide path 11. The wheel 16 can rotate about a shaft 17. The rollers 15 are rotatably secured in the member 14, which is maintained on the guide path by means of a compression spring 18 having a press plate 20 and a housing 19 secured to the member 14. Three clasps 21 carry the three members 15 and are provided with rods 22 which extend through the supporting plate 13 and are jointly secured to a pressure plate 23 which has a central tube 24 (shown in part). The supporting plate 13 has a central aperture 25 which is larger than the diameter of the shaft 26 to be treated. The shaft 26 bears in a cup 27 on a base plate 28. The latter can slide in cup 27 and is subject to the action of a compression spring 29, but an edge 30 on the base plate 28 prevents sliding thereof to the left-hand side. The base plate 28 has an aperture 31 a little larger than the diameter of the shaft 26. Also a central aperture 32 in the base plate 10 is a little larger than this diameter. Furthermore, an angle lever 33 is pivotally secured to the cup 27. The angle lever 33 has two arms, the lower arm 34 of which can move into a cut 35 of the base plate 10, thus pressing against the base plate 28.

When the shaft 26, which has a diameter not larger than 6 mms.; is to be provided with grooves shown in FIG. 2, the shaft is introduced into the tube 24. The shaft 26 falls downwards and is guided by wheels 16, which occupy their highest position, so that the extremity of the shaft bears in the cup 27 on the base plate 28. Subsequently, the pressure plate 23 is moved downwards. The rods 22 push the bifurcated members 14 downwards and, since the rollers 15 now come on the projecting parts 12 of the guide paths 11, the wheels 16 are forced into the shaft 26, thus forming a groove with projecting edges. As soon as the rollers 15 leave the projecting parts 12, the bifurcated members 14, forced by the springs 18, move again towards the guide paths 11, whereby the wheels 16 can come clear off the shaft 26. At the same time, the lower side of one clasp 21 presses against the angle lever 33, causing it to turn and push the base plate 28 away, so that the aperture 31 comes under the shaft 26, which can now freely fall by gravity out of the device.

It will be evident that, by varying the shape of the projecting parts 12, it is also possible to provide both deep and shallow grooves and continuous or non-continuous grooves in the shaft. Also the base plate 28 may be removed in a different manner, for example by magnetic means, it being possible in this case to provide either the clasp 21 or the press plate 23 with contacts which co-act with stationary contacts. The whole device may operate automatically with means known per se, a shaft being supplied, for example, at the highest position of the wheels and the supply being shut off during the movement of the wheels.

It is alternatively possible for the device to be designed so that the shaft moves and the bifurcated wheels are at rest. In this case the distance between the wheels and the centre line of the shaft must be controlled, for example, by means of cam discs, resulting in a device which is more expensive and more complicated.

It has been found in practice that a device as shown can operate rapidly and accurately and that, on the one hand, the superfinished surface is not damaged and, on the other hand, the shaft remains completely straight.

What is claimed is:

1. A device for providing the outer surface of a superfinished steel shaft having a maximum diameter of 6 mms. with a plurality of substantially parallel grooves comprising an apertured base plate, an apertured support on said base plate for said shaft, an apertured cup-shaped member on said support and having one end of said shaft in said aperture a plurality of guide elements located on said base plate in parallel relation to said shaft, said guide elements each having projecting parts, means for connecting said guide elements together in a rigid assembly, a bifurcated member movable on each of said guide elements, a sharp-edged, steel wheel rotatably mounted in each of said bifurcated members and cutting grooves in said shaft only when said bifurcated members ride on the projecting parts of said guide elements, and means for moving said support, base plate and cup-shaped member relative to each other whereby said apertures are aligned and said shaft falls by gravity through said apertures and out of of said device.

2. A device for providing the outer surface of a superfinished steel shaft having a maximum diameter of 6 mms. with a plurality of substantially parallel grooves comprising an apertured base plate, a support on said base plate for said shaft provided with an opening therethrough, an apertured cup-shaped member on said support and having one end of said shaft in said aperture, a plurality of guide elements located on said base plate in parallel relation to said shaft, said guide elements each having projecting parts, means for connecting said guide elements together in a rigid assembly, a bifurcated member movable on each of said guide elements, a sharp-edged, steel wheel rotatably mounted in each of said bifurcated members and cutting grooves in said shaft only when said bifurcated members ride on the projecting parts of said guide elements, a lever pivotally secured to said cup-shaped member for moving said support relative to said base plate and cup-shaped member whereby said apertures and opening are aligned and said shaft falls by gravity through said apertures and opening and out of the device.

3. A device as claimed in claim 2 further comprising a compression spring engaging said support and normally maintaining said opening in the support in non-alignment with said shaft.

References Cited in the file of this patent

UNITED STATES PATENTS

| | | |
|---|---|---|
| 62,684 | Putnam et al. | Mar. 5, 1867 |
| 110,532 | Alden | Dec. 27, 1870 |
| 338,446 | Sloan | Mar. 23, 1886 |
| 1,889,324 | Tryon | Nov. 29, 1932 |

FOREIGN PATENTS

| | | |
|---|---|---|
| 268,622 | Great Britain | Apr. 7, 1927 |
| 892,849 | Germany | Oct. 12, 1953 |
| 953,252 | Germany | Nov. 29, 1956 |